Oct. 19, 1926.　　　　　E. W. BALDWIN　　　　　1,603,826

CLUTCH SAFETY LOCK

Filed July 13, 1925

INVENTOR
*Ernest W. Baldwin*
BY
*Arthur Le Brown*
ATTORNEY

Patented Oct. 19, 1926.

1,603,826

UNITED STATES PATENT OFFICE.

ERNEST W. BALDWIN, OF WICHITA, KANSAS, ASSIGNOR TO THE GLEANER HARVESTER COMPANY, OF WICHITA, KANSAS, A CORPORATION OF KANSAS.

CLUTCH SAFETY LOCK.

Application filed July 13, 1925. Serial No. 43,210.

This invention relates to clutch operating mechanism in which there is a clutch between the power shaft of a prime mover and the prime mover, a power transmission means from the power shaft, and a clutch connecting the power transmission means to an auxiliary or driven shaft such as is used, for example, in tractor driven harvesting and threshing machines.

The first clutch is used to connect the prime mover to the power shaft for propelling the tractor, and the second clutch is used to transmit power from the power shaft to the harvesting and threshing machine. The second clutch is usually a jaw clutch.

The main purpose of this invention is to make it impossible for the two jaws of the jaw clutch to be brought together while the driving shaft is connected to the engine by the engine clutch, for example, while the tractor is being propelled over the ground under conditions where it is not advisable to operate the harvesting and threshing mechanism. Of course the same mechanism might be used for driving a harvester without the threshing attachment, and it might be found desirable to apply the mechanism to other purposes. It is desirable that both the clutch jaws be in a state of rest when the two jaws are brought into clutching engagement so that danger of breaking the jaws of the clutch by bringing them together while one of the jaws is rotated, will be wholly eliminated.

In order to have the primary purpose of the invention clearly understood, attention is called to the fact that while the tractor is moving over a highway or over the ground where harvesting is not to be performed it is customary to throw out the jaw clutch, but due to the vibration of the machinery the operating mechanism for the jaw clutch sometimes jars loose and allows the jaw clutch elements to be thrown into mesh. This subjects all the moving parts to severe shocks and strain due to the sudden load put on the engine and the parts which it operates. Not infrequently the sudden loading up of the engine causes parts to break, but with my invention these disadvantages are overcome.

The object of the invention is accomplished by associating the operating mechanism of the jaw clutch with the engine clutch so that the jaw clutch members cannot be brought together prior to throwing out the engine clutch, this generally being accomplished by depressing the clutch pedal which is part of the operating mechanism for the engine clutch.

Figure 1:
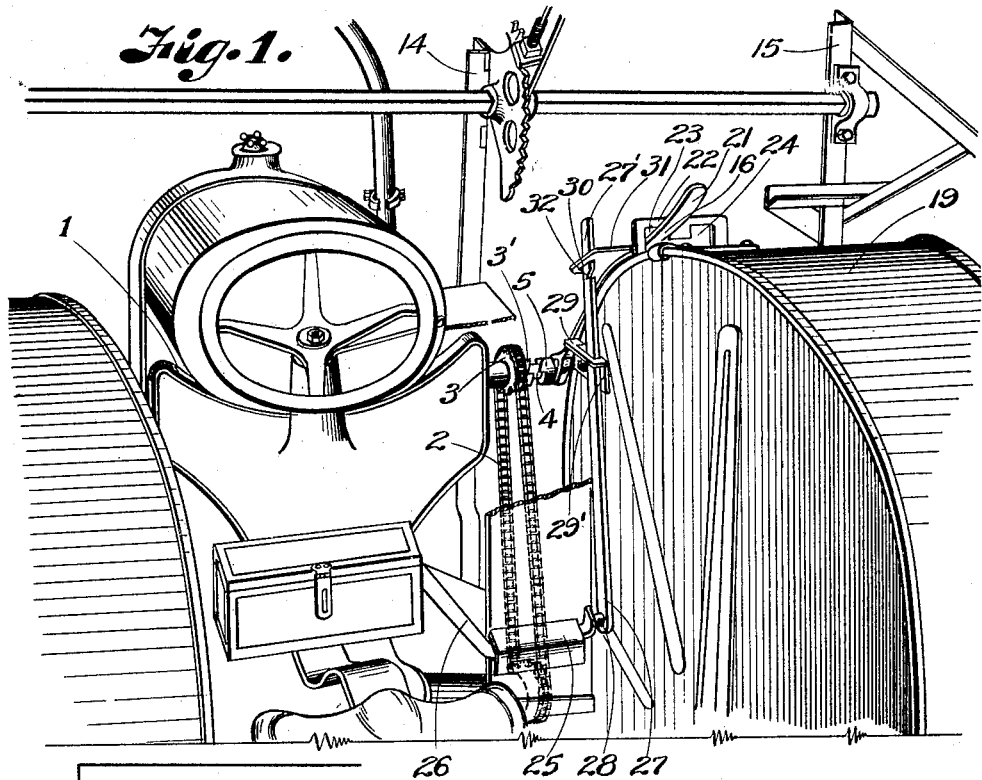
Figure 2:
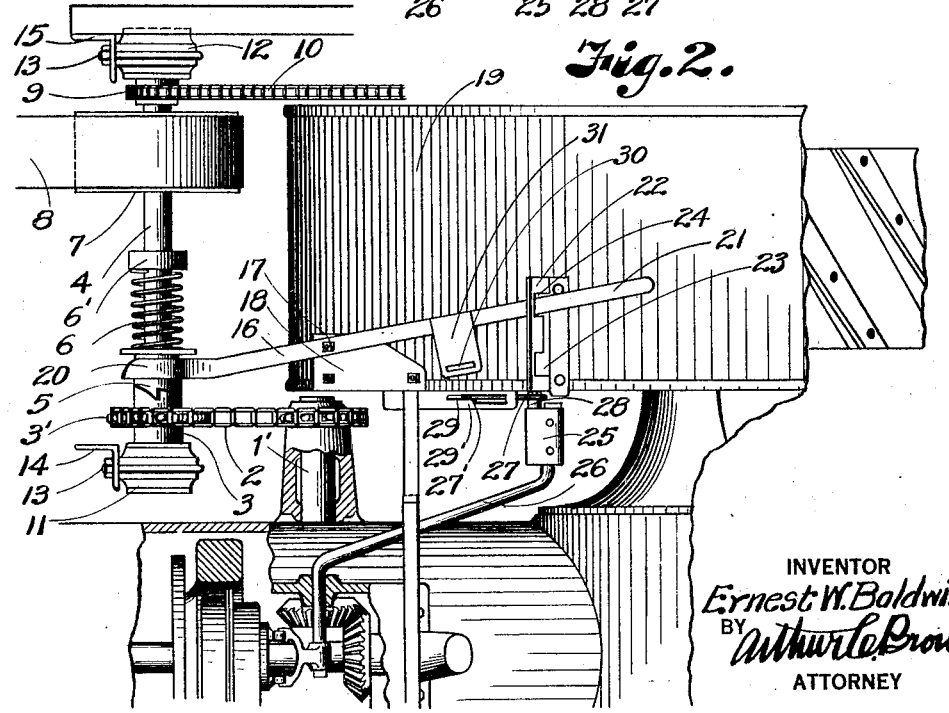

The details of the preferred embodiment of my invention will be clearly understood by reference to the following description in connection with the acompanying drawings, in which Fig. 1 is a perspective view of part of the tractor with the safety lock or detent applied, and Fig. 2 is a plan view showing the shaft with the jaw clutch control lever, detent or safety lock and such parts of the tractor as are necessary to show the application of my invention.

The invention will be described hereinafter as part of a self-contained combined harvester-thresher in which power to drive the harvester-thresher and the separating machinery is derived from the power take-off of the tractor and applied to the harvesting-threshing machinery through an auxiliary counter shaft hereinafter described as a driven shaft.

The power plant for the tractor generically is designated 1. It consists of the usual internal combustion engine with a clutch mechanism between the crank shaft or fly wheel and the transmission to the wheels of the tractor. The transmission drives a power shaft 1', and the clutch is operated by a clutch pedal to be hereinafter referred to. The power shaft carries a sprocket which drives a chain 2, in turn driving a rotatable member 3 constituting one of the clutch jaws of a clutch through the medium of the sprocket 3'. The clutch member 3 is mounted upon the driven or auxiliary shaft 4 carried by the harvester-thresher, and it supports a complementary clutch jaw 5 normally urged to clutching engagement with the member 3 by an expansion spring 6, one end of which bears against the clutch member 5 and the other against the collar 6' on the shaft 4. The clutch member 3 can rotate without rotating the shaft 4, but the clutch member 5 is mounted to rotate the shaft 4 when it rotates. This is usually accomplished by splining the member 5 on the shaft 4. The shaft 4 carries a pulley 7 which drives a belt 8 in turn communicating motion to the cylinder of the threshing machine. On the shaft 4 is a sprocket 9 which drives a chain 10 through which the motion is communicated to the separator.

The shaft 4 is supported in bearings 11 and 12, each being provided with a U-bolt 13 so that the bearings can be secured to the angle columns 14 and 15 on the thresher-harvester. In order to release the clutch member 5 from the clutch member 3 I provide a lever 16 having a forked end 20 straddling the clutch jaw 5. The lever 16 is pivoted at 17 to a bracket plate 18. The end 21 of the lever 16 is adapted to be swung by the hand of the operator so that it will fulcrum on 17 to release the clutch member 5. The end 21 passes through a notched plate or holder 22 which is fastened to the fender 19. There are two notches 23 and 24. The lever 21 is shown as engaging the notch 24 so that the member 5 will be in clutching engagement with the member 3, but when the handle 21 is in notch 23, the clutch member 5 will be out of engagement with the clutch member 3, as will be obvious by reference to Fig. 2. When the handle 21 is in engagement with the notch 23 it may be held against accidental displacement by certain novel detaining mechanism which I will proceed to describe.

The engine clutch is controlled by a foot pedal 25 fastened to lever 26 so that when the foot pedal 25 is depressed, the engine clutch will be released, and when pressure is removed from the pedal 25, the foot pedal will raise, permitting the clutch for the engine and its drive shaft to connect the drive shaft to the engine in the usual way.

The detent for the handle lever 16 is illustrated as comprising a bar 27 pivoted to an offset pin 28 carried by the clutch pedal 25. The bar 27 is adapted to project through a slot 29 in the bracket 29' carried by the harvester-thresher and it is adapted to project through the slot 30 in the offset plate 31 carried by the hand lever 21 when the slot 30 is in line with the upper end 27' of the bar 27.

Suppose that the parts are in the position shown in Fig. 2 and it is desired to throw out the clutch for the shaft 4 and to hold it out. The operator swings the handle 21 over into the notch 23. This brings the slot 30 in register with slot 29 and in register with the end of the bar 27. This should be done while the clutch pedal 25 is depressed, then when the operator releases pressure on the pedal 25 the bar 27 will pass up through the slot 30 to act as a detent for the lever 16, so that the lever 16 may be swung on its pivot 17 but the handle 21 will be held against displacement from the notch 23. Consequently the clutch members 3 and 5 will be out of engagement and the tractor can move over the ground without operating the harvester-thresher.

It will therefore, be apparent that the danger of the lever 16 jarring out of the notch 23 will be entirely eliminated.

When it is desired to throw the clutch member 5 into engagement with the clutch member 3, the operator will press upon the pedal 25 to throw out the engine clutch, at the same time withdrawing the detent bar 27 from engagement with the slot 30. Then the operator can swing the lever 16 out of notch 23 so the spring 6 can force the member 5 into engagement with the member 3.

If it is desired to hold the engine clutch in released position, pressure may be applied on the end 27' of bar 27 so that the notch 32 will engage in the edge of the slot 29 to thereby hold the foot pedal 25 in depressed position, for example, when the engine is operating.

I have specifically described the invention in connection with a tractor harvester-thresher mechanism, but I do not wish to be limited to this particular use, as changes in form, proportion and minor details of construction may be resorted to without departing from the spirit of the invention.

What I claim and desire to secure by Letters-Patent is:

1. In combination, a power plant having a motor driven drive shaft, an auxiliary power shaft, means for connecting and disconnecting the motor driven drive shaft to its motor, power transmission means between the two shafts, means for connecting and disconnecting the power transmission means to the auxiliary drive shaft, connections between the two means whereby when the first is in position for connecting the drive shaft to the motor, said second means for connecting the power transmission means and the second shaft cannot be moved into position to drive the second shaft until said first means is moved to disconnecting position, and means for holding said first means in connecting position when said second means is in disconnecting position.

2. In combination, a motor driven drive shaft, a clutch operating mechanism for connecting and disconnecting the drive shaft with respect to the motor, an auxiliary drive shaft, driving connections driven by the first shaft including a clutch member adjacent to the auxiliary shaft, a clutch member on the auxiliary shaft for clutching engagement with the clutch member, means for operating the second clutch member, a detent controlled by the clutch operating mechanism for the drive shaft engaging the clutch member operating mechanism for the auxiliary shaft to hold the same in disconnecting position when the drive shaft and motor are connected together and means for holding said drive shaft clutch operating mechanism in driving position when said other clutch is in disconnecting position.

3. In combination, a motor driven power shaft, a clutch pedal for operating a clutch to connect and disconnect the power shaft with respect to the motor, a power transmission mechanism including a driven clutch member, an auxiliary shaft, a spring-actuated clutch member movable into and out of engagement with the first-named clutch member, a lever for retracting the movable clutch member, a slotted member on the lever, and a detent operated by the clutch pedal movable into and out of engagement with the slotted member.

4. In combination with a power plant including a prime mover, the usual power shaft with its clutch and its clutch pedal, of an auxiliary shaft, means for transmitting power from the power shaft to the auxiliary shaft including a clutch member, a spring-actuated clutch member on the auxiliary shaft, a lever for moving the spring-actuated clutch member away from the first-named clutch member, and a locking detent for the lever actuated by the clutch pedal.

5. In combination with a power plant including a prime mover, the usual power shaft with its clutch and its clutch pedal, of an auxiliary shaft, means for transmitting power from the power shaft to the auxiliary shaft including a clutch member, a spring-actuated clutch member on the auxiliary shaft, a lever for moving the spring-actuated clutch member away from the first-named clutch member, a notched member receiving the free end of the lever, and a locking detent for the lever actuated by the clutch pedal.

In testimony whereof I affix my signature.
ERNEST W. BALDWIN.